United States Patent
Roudeski

(10) Patent No.: US 9,297,514 B2
(45) Date of Patent: *Mar. 29, 2016

(54) LIGHTING SYSTEM

(71) Applicant: Hughey & Phillips, LLC, Urbana, OH (US)

(72) Inventor: Charles A. Roudeski, Springfield, OH (US)

(73) Assignee: HUGHEY & PHILLIPS, LLC, Urbana, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,991

(22) Filed: Apr. 20, 2015

(65) Prior Publication Data
US 2015/0226402 A1 Aug. 13, 2015

Related U.S. Application Data

(63) Continuation of application No. 13/423,483, filed on Mar. 19, 2012, now Pat. No. 9,010,969.

(60) Provisional application No. 61/453,944, filed on Mar. 17, 2011, provisional application No. 61/454,237, filed on Mar. 18, 2011, provisional application No. 61/511,872, filed on Jul. 26, 2011.

(51) Int. Cl.
*F21V 7/00* (2006.01)
*F21V 7/09* (2006.01)
(Continued)

(52) U.S. Cl.
CPC ... *F21V 7/09* (2013.01); *B64F 1/20* (2013.01); *F21S 8/032* (2013.01); *F21V 5/048* (2013.01);
(Continued)

(58) Field of Classification Search
CPC ........................................................ B64D 47/06
USPC .................................................. 340/961, 981
See application file for complete search history.

(56) References Cited

U.S. PATENT DOCUMENTS 4,498,004 A 2/1985 Adolfsson et al.
4,609,306 A 9/1986 Loire
(Continued)

FOREIGN PATENT DOCUMENTS

CN 201636748 U 11/2010
EP 1231109 A1 8/2002
(Continued)

OTHER PUBLICATIONS

Promotional Sheet, Excelitas Technologies "Lighting Solutions for Safety and Security". 4 pages.
(Continued)

*Primary Examiner* — Diane Lee
*Assistant Examiner* — Gerald J Sufleta, II
(74) *Attorney, Agent, or Firm* — Michael A. Forhan; James R. Eley; Eley Law Firm Co., LPA

(57) ABSTRACT

A lighting system having a reflector with a plurality of reflecting surfaces. The plurality of reflecting surfaces have at least one optical axis, and the reflecting surfaces further include a linearly projected cross-section along a respective linear axis. A plurality of light emitting diodes (LEDs) are positioned in a line generally parallel to the linearly projected cross-section of the plurality of reflecting surfaces. The LEDs are oriented relative to an associated reflecting surface such that a central light-emitting axis of the plurality of LEDs is angled relative to the at least one optical axis of the associated reflecting surface at about 45°. The reflecting surfaces redirect and collimate a light output of the plurality of LEDs at an angle of about 45° with respect to the central light emitting axis of the plurality of LEDs.

16 Claims, 7 Drawing Sheets

(51) Int. Cl.
*B64F 1/20* (2006.01)
*F21S 8/00* (2006.01)
*F21V 7/04* (2006.01)
*F21V 29/70* (2015.01)
*F21V 5/04* (2006.01)
*F21V 23/00* (2015.01)
*F21W 111/06* (2006.01)
*F21Y 101/02* (2006.01)
*F21V 23/04* (2006.01)
*F21V 29/74* (2015.01)
*F21V 29/75* (2015.01)
*F21Y 111/00* (2006.01)

(52) U.S. Cl.
CPC ............... *F21V 7/0058* (2013.01); *F21V 7/041* (2013.01); *F21V 7/048* (2013.01); *F21V 23/009* (2013.01); *F21V 29/70* (2015.01); *B64D 2203/00* (2013.01); *F21V 7/0008* (2013.01); *F21V 23/0464* (2013.01); *F21V 29/74* (2015.01); *F21V 29/75* (2015.01); *F21W 2111/06* (2013.01); *F21Y 2101/02* (2013.01); *F21Y 2111/001* (2013.01); *Y02T 50/82* (2013.01); *Y10T 29/49826* (2015.01)

(56) References Cited

U.S. PATENT DOCUMENTS

| | | | |
|---|---|---|---|
| 5,155,666 | A | 10/1992 | Radford et al. |
| 5,608,290 | A | 3/1997 | Hutchisson et al. |
| 5,642,933 | A | 7/1997 | Hitora |
| 5,838,247 | A | 11/1998 | Bladowski |
| 5,929,788 | A | 7/1999 | Vukosic |
| 6,022,124 | A | 2/2000 | Bourn et al. |
| 6,070,994 | A | 6/2000 | Sebek et al. |
| 6,183,100 | B1 | 2/2001 | Suckow |
| 6,364,506 | B1 | 4/2002 | Gallo |
| 6,379,026 | B1 | 4/2002 | Petrick |
| 6,425,678 | B1 | 7/2002 | Verdes et al. |
| 6,464,373 | B1 | 10/2002 | Petrick |
| 6,525,668 | B1 | 2/2003 | Petrick |
| 6,561,689 | B1 | 5/2003 | Kidd et al. |
| 6,601,970 | B2 | 8/2003 | Ueda et al. |
| 6,637,921 | B2 | 10/2003 | Coushaine |
| 6,679,618 | B1 | 1/2004 | Suckow et al. |
| 6,705,745 | B1 | 3/2004 | Pederson |
| 6,793,372 | B2 | 9/2004 | Wehner et al. |
| 6,932,496 | B2 | 8/2005 | Rizkin et al. |
| 6,948,830 | B1 | 9/2005 | Petrick |
| 6,991,351 | B1 | 1/2006 | Petrick |
| 7,040,782 | B2 | 5/2006 | Mayer |
| 7,079,041 | B2 | 7/2006 | Fredericks et al. |
| 7,160,004 | B2 | 1/2007 | Peck |
| 7,163,322 | B2 | 1/2007 | Tatewaki et al. |
| 7,236,105 | B2 | 6/2007 | Brenner et al. |
| 7,237,929 | B2 | 7/2007 | Stahl |
| 7,497,593 | B2 | 3/2009 | Wang |
| 7,568,821 | B2 | 8/2009 | Peck et al. |
| 7,578,600 | B2 | 8/2009 | Czajkowski |
| 7,604,384 | B2 | 10/2009 | Peck |
| 7,658,513 | B2 | 2/2010 | Peck |
| RE41,153 | E | 3/2010 | Mork et al. |
| 7,758,210 | B2 | 7/2010 | Peck |
| 7,783,427 | B1 | 8/2010 | Woodell et al. |
| 7,791,497 | B2 | 9/2010 | Clerk |
| 7,832,908 | B2 | 11/2010 | Peck et al. |
| 7,908,079 | B1 | 3/2011 | Dabney et al. |
| RE42,708 | E | 9/2011 | Mark et al. |
| 8,033,683 | B2 | 10/2011 | Fields |
| 8,096,677 | B2 | 1/2012 | Fields et al. |
| 8,591,073 | B2* | 11/2013 | Peck ..................... B64F 1/20 362/247 |
| 9,013,331 | B2 | 4/2015 | Wise |
| 9,016,896 | B1 | 4/2015 | Roudeski |
| 2001/0015899 | A1 | 8/2001 | Kondo et al. |
| 2004/0004836 | A1 | 1/2004 | Dubuc |
| 2004/0057234 | A1 | 3/2004 | Mohacsi |
| 2004/0057244 | A1 | 3/2004 | Amano |
| 2004/0145910 | A1 | 7/2004 | Lisowski |
| 2004/0196646 | A1* | 10/2004 | Machi ................... B64D 47/06 362/602 |
| 2005/0015202 | A1 | 1/2005 | Poe et al. |
| 2005/0094393 | A1 | 5/2005 | Czajkowski |
| 2005/0157490 | A1 | 7/2005 | Klose |
| 2006/0007012 | A1 | 1/2006 | Machi et al. |
| 2006/0012990 | A1 | 1/2006 | Walser et al. |
| 2006/0198141 | A1* | 9/2006 | Peck ....................... B64F 1/20 362/247 |
| 2006/0291209 | A1 | 12/2006 | Booth et al. |
| 2008/0192480 | A1 | 8/2008 | Rizkin et al. |
| 2009/0115637 | A1 | 5/2009 | Naimer et al. |
| 2009/0201190 | A1 | 8/2009 | Huthoefer et al. |
| 2009/0219715 | A1 | 9/2009 | Peck et al. |
| 2010/0027281 | A1* | 2/2010 | Waters .................. B64D 47/06 362/470 |
| 2010/0084979 | A1 | 4/2010 | Burton et al. |
| 2010/0194603 | A1 | 8/2010 | Wobben |
| 2010/0244748 | A1 | 9/2010 | Haab et al. |
| 2010/0253546 | A1* | 10/2010 | Ibrahim ............... G08G 5/0008 340/961 |
| 2010/0259929 | A1 | 10/2010 | Henri et al. |
| 2011/0018439 | A1* | 1/2011 | Fabbri .................... B64D 47/06 315/77 |
| 2011/0051421 | A1 | 3/2011 | Chew |
| 2011/0058370 | A1 | 3/2011 | Datz et al. |
| 2011/0121734 | A1 | 5/2011 | Pape |
| 2011/0194283 | A1 | 8/2011 | Roer |
| 2011/0235322 | A1 | 9/2011 | Fields et al. |
| 2011/0241926 | A1 | 10/2011 | Laufer |
| 2011/0305014 | A1 | 12/2011 | Peck |
| 2012/0300449 | A1* | 11/2012 | Fields .................. F21V 7/0058 362/231 |
| 2014/0036502 | A1* | 2/2014 | Peck et al. ..................... 362/247 |

FOREIGN PATENT DOCUMENTS

| | | |
|---|---|---|
| EP | 1698823 B1 | 4/2010 |
| EP | 2199206 A1 | 6/2010 |
| WO | 2009084049 A1 | 7/2009 |
| WO | 2009090185 A2 | 7/2009 |
| WO | 2009133326 A2 | 11/2009 |
| WO | 2012039776 A1 | 3/2012 |

OTHER PUBLICATIONS

European Search Report, Application EP12160211, mailed Aug. 7, 2013.
Urgent Communications, View From the Top Blog, "A New Development in Tower-Aviation Safety", pp. 1-3, Mar. 7, 2013, http://urgentcomm.com/blog/new-development-tower-aviation-safety.
Federal Communications Commission, FCC 13-30 Report and Order, promoting aviation safety, Mar. 1, 2013.
ADS-B Technologies, Product menu, "Mobile & Tactical ADS-B Systems", Nov. 29, 2011, http://www.ads-b.com/LISTgallery3.htm.
Patriot Technologies, LLC, Lori Huthoefer, Power Point Presentation, "The Runway Occupancy Warning System (ROWS)", Jul. 18, 2011, www.patriot-technologies.com.
Citation Excel, Informational Flyer, "Runway Status Lights", Jun. 11, 2011, www.ce560xl.com/files/RWSL.pdf.
Jeppesen, Jepp View 3.6.3.1, Informational Flyer, "Pilot Guide to Runway Status Lights (RWSL) Logan International Airport (BOS)", Jun. 30, 2010.
Roger-Wilco, Life Around Runways by Steve, "New Tools in the Arsenal to Prevent Runway Incursions—RWSL and FAROS", Mar. 16, 2010, www.roger-wilco.net.
Lincoln Laboratory Journal, James R. Eggert, Bradley R. Howes, Maria Picardi Kuffner, Harald Wilhelmsen, and D. Jonathan Bernays, "Operational Evaluation of Runway Status Lights", pp. 123-146, vol. 16, No. 1, 2006.

(56) References Cited

OTHER PUBLICATIONS

NASA, J. Timmerman, Rockwell Collins, CR-2001-211242 Report, "Runway Incursion Prevention System ADS-B and DGPS Data Link Analysis Dallas-Ft. Worth International Airport", Nov. 2001, Cedar Rapids, Iowa.

Dialight Corp., Product datasheet for D164 Series LED Red Beacon, printed Jan. 21, 2011.

European Search Report, Application EP12182139, mailed Dec. 12, 2013.

Avionics Today Article, "NAV Canada Extends ADS-B Coverage," Mar. 30, 2012, www.aviationtoday.com/av/commercial/NAV-Canada-Extends-ADS-B-Coverage__76059.html#Umkns1M1nfs.

Data Sheet, Orga Model AOL1000SA High Intensity Aeronautical Obstruction Light.

Publication Date: February 22, 2011, Promotional Sheet, Excelitas Technologies "Lighting Solutions for Safety and Security". 4 pages.

\* cited by examiner

LIGHTING SYSTEM

CROSS-REFERENCE TO RELATED APPLICATIONS

This application is a continuation of U.S. patent application Ser. No. 13/423,483, filed Mar. 19, 2012, now U.S. Pat. No. 9,010,969, which claims priority to U.S. provisional application 61/453,944, filed Mar. 17, 2011, U.S. provisional application 61/454,237, filed Mar. 18, 2011, and U.S. provisional application 61/511,872, filed Jul. 26, 2011. The entire contents of each of these applications are expressly incorporated herein by reference thereto.

FIELD

The present invention relates generally to lighting systems, in particular to obstruction lighting systems utilizing light emitting diodes.

BACKGROUND

The Federal Aviation Administration (FAA) requires that obstructions to aircraft navigation, such as towers, cables and tall buildings be fitted with visibly perceivable elements to render these structures highly visible to approaching aircraft. FAA Advisory Circular 150/5345-43 forms a specification of technical requirements for these lights in the United States. Within Advisory Circular 150/5345-43 there exists a requirement for a medium-intensity flashing red obstruction light system, designated the "L-864" and a medium-intensity flashing white obstruction light, designated the "L-865." These obstruction lights are to be placed in accordance with a set plan at levels on all obstructions that are potential hazards to air navigation.

For the L-864 obstruction light, at all radials throughout a 360 degree azimuth, there must be a peak effective intensity of 2,000±25 percent candela. There must also be a minimum effective intensity of 750 candela throughout a minimum vertical beam spread of 3 degrees. For the L-865 obstruction light, at all radials throughout a 360 degree azimuth, there must be a peak effective intensity of 20,000±25 percent candela during operation at day and twilight conditions, and 2,000±25 percent candela during night conditions. The L-865 obstruction light also includes a minimum vertical beam spread of 3 degrees.

A drawback of these obstruction lights is that they typically utilize incandescent lamps, which have a relatively limited service life. Consequently, the incandescent lamps require frequent replacement. Since the obstruction lights are mounted atop tall structures, replacing these lamps can be inconvenient, time-consuming, expensive and even dangerous. Utilizing light emitting diodes (LEDs) as a light source in obstruction lights overcomes many of these drawbacks. However, LEDs present new design challenges.

Another drawback of conventional obstruction lights is light pollution. Light pollution as it relates to obstruction lighting may be generally defined as the emission of light outside the band specified by Advisory Circular 150/5345-43. Light pollution can be an annoyance, particularly when the obstruction light is proximate to residential areas. In some cases light pollution can cause problems such as sleep deprivation or the blocking of an evening view.

In an optical system for an obstruction light, one approach for arranging LED light sources is to orient them vertically, aimed outwardly from the light assembly. However, shaping multiple light sources into a tight continuous horizontal beam requires a lens, which is less efficient than a reflector. Additionally, the LED junctions thusly configured are more vulnerable to damage due to lightning effects.

Another approach is to mount the LEDs so they are oriented horizontally and aimed upwardly, using a reflector to shape and redirect the light outwardly. In this configuration the reflector is very efficient and also acts as a lightning mediator. Another advantage of this arrangement is that it minimizes direct-light emissions from the LEDs shining downwardly from the obstruction light, which may be considered a neighborhood annoyance.

Orienting LEDs so that they are aimed downwardly is also desirable since it offers more efficient cooling of the LEDs and makes servicing of the LEDs more convenient. However, this arrangement is problematic because it inherently directs some of the LED light toward the neighborhood below the obstruction light.

Moreover, horizontally orienting LEDs and aiming them toward a reflector is undesirable, as this directs the brightest part of the LED beam toward the flatter area of the reflector, thereby reducing beam focus.

SUMMARY

An obstruction light utilizing LEDs as a light source is disclosed according to an embodiment of the present invention. The LEDs are oriented and aimed toward a reflector so as to minimize downwardly-directed light while also enhancing the characteristics of the desired light output from the reflector.

One object of the present invention is a lighting system comprising a reflector having a plurality of reflecting surfaces. The plurality of reflecting surfaces have at least one optical axis, and the reflecting surfaces further include a linearly projected cross-section along a respective linear axis. In one embodiment, the linearly projected cross-section of the reflecting surfaces comprise a substantially conic shape. A plurality of light emitting diodes (LEDs) are positioned in a line generally parallel to the linearly projected cross-section of the plurality of reflecting surfaces. The LEDs are oriented relative to an associated reflecting surface such that a central light-emitting axis of the plurality of LEDs is angled relative to the at least one optical axis of the associated reflecting surface at about 45°. The reflecting surfaces redirect and collimate a light output of the plurality of LEDs at an angle of about 45° with respect to the central light emitting axis of the plurality of LEDs.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
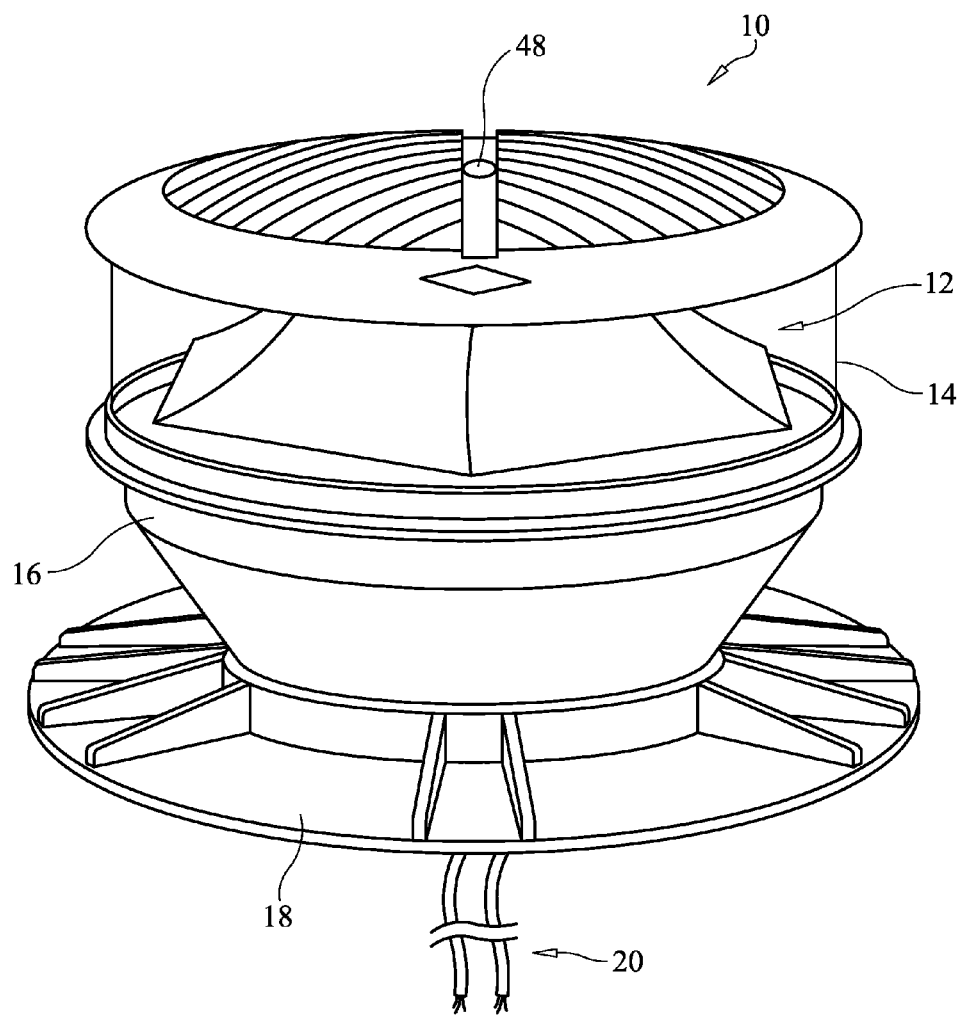
FIG. 1 is a perspective view of an obstruction light according to embodiment of the present invention.

The general arrangement of a lighting system 10 usable as an obstruction light, among other purposes, is shown in FIG. 1 according to an embodiment of the present invention. Lighting system 10 comprises an optic 12, a lens 14, a housing 16, a mounting base 18, an electrical connection 20 to the lighting system, and circuitry (not shown) to drive the lighting system. In one embodiment, a drive circuit (not shown) is disposed within a housing 16 and is capable of strobing optic 12 at one or more predetermined flash rates. Housing 16 supports optic 12, which is coupled thereto, and mounting base 18 provides a means for attaching lighting system 10 to a structure.

Figure 2:
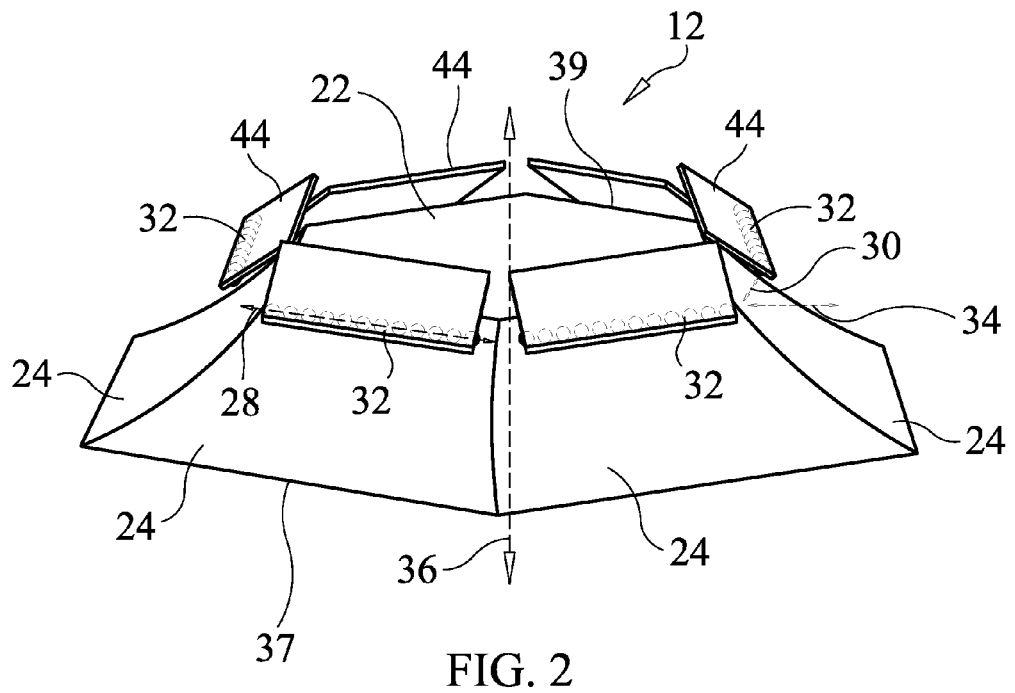
FIG. 2 is a perspective view of an embodiment of an optic of the obstruction light shown in FIG. 1.

FIG. 2 is a perspective view showing details of optic 12 according to an embodiment of the present invention. Optic 12 comprises a reflector 22 having a plurality of reflecting surfaces 24 that form a segmented-type reflector. Reflector 22 may be any type of optical reflector suitable for use with obstruction light 10. For example, reflector 22 may be, without limitation, in the form of a half-parabolic reflector.

Figure 3:
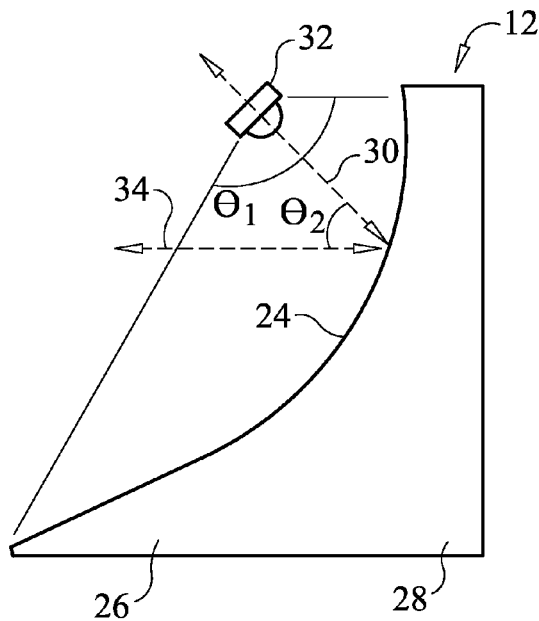
FIG. 3 is a partial sectional side view of an embodiment of the optic shown in FIG. 2.

With continued reference to FIG. 2, FIG. 3 depicts a partial sectional side view of optic 12. Each reflecting surface 24 comprises a cross-section 26, projected along an associated linear axis 28. As can be seen, reflecting surface 24 has a generally conic cross-section, and a central light-emitting axis 30 of a light emitting diode (LED) 32 is in the same plane as the cross-section. FIG. 3 also shows an angle $\theta_1$ over which light emitted from LED 32 is reflected by reflecting surface 24. In one embodiment, the linearly projected cross-section 26 comprises a conic section. In other embodiments cross-section 26 of reflecting surface 24 comprises at least one of a conic or a substantially conic shape. In various embodiments the conic shape comprises at least one of a hyperbola, a parabola, an ellipse, a circle, or a modified conic shape.

In some embodiments of the present invention reflecting surface 24 is neither concave or convex along linear axis 28. In other embodiments reflecting surface 24 may be concave along linear axis 28. In still other embodiments reflecting surface 24 may be convex along linear axis 28.

Each reflecting surface 24 has an associated optical axis 34. In one embodiment, each reflecting surface 24 reflects a beam of light having an angular distribution that is horizontally symmetric to the associated optical axis 34, i.e., symmetric about the associated optical axis in directions along linear axis 28.

Reflector 22 may be made from any suitable material including, without limitation, metal or a reflective material. Non-limiting examples of materials for reflector 22 include highly-polished metal, a coated (i.e., "metalized") metal or non-metal substrate, and a reflective film applied to a metal or non-metal substrate.

For each reflecting surface 24, optic 12 comprises at least one associated LED 32. LED 32 typically emits light in a hemisphere centered and concentrated about central light-emitting axis 30. LED 32 is positioned relative to the associated reflecting surface 24 such that central light-emitting axis 30 of the LED is angled at a predetermined angle $\theta_2$ relative to the optical axis 34 associated with the reflecting surface 24. In a preferred embodiment, $\theta_2$ has a value of about 45°. In some embodiments of the present invention, the about 45° value has a tolerance of ±15°, i.e., from 30° to 60°.

Figure 4:
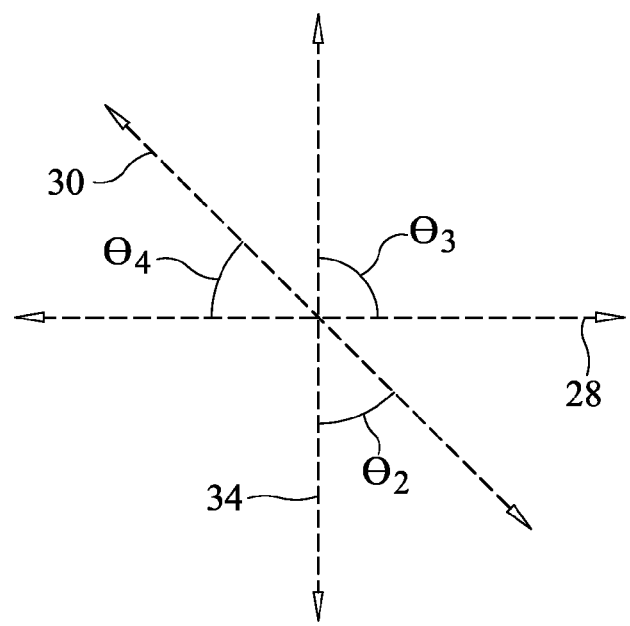
FIG. 4 shows the angular relationship between an optical axis associated with a reflecting surface of the optic of FIG. 2, a central light emitting axis of an LED of the optic, and a linear axis of the reflecting surface.

With reference now to FIG. 4 in combination with FIGS. 2 and 3, in one embodiment of the present invention, for a specific reflecting surface 24 and associated LED 32, the central light-emitting axis 30 of the LED, the optical axis 34 associated with the reflecting surface, and the linear axis 28 of the reflecting surface form axes of a 3-axis linear coordinate system. $\theta_2$ is the angle between central light-emitting axis 30 and optical axis 34. $\theta_3$ is the angle between optical axis 34 and linear axis 28. $\theta_4$ is the angle between the central light emitting axis 30 and the linear axis 28. In one embodiment, the relationship between central light-emitting axis 30, optical axis 34 and linear axis 28 is approximate. For example, each of central light-emitting axis 30, optical axis 34, and linear axis 28 can be angled at 45° from each of the other two axes, with a tolerance, in some embodiments, of ±15°.

As shown in FIG. 2, for each reflecting surface 24, optic 12 includes a plurality of associated LEDs 32. In one embodiment, the plurality of associated LEDs 32 are arranged along a line, generally parallel to linear axis 28 of reflecting surface 24. In other embodiments of the present invention the plurality of associated LEDs 32 may be generally staggered about a predetermined line. For example, in one embodiment, the plurality of associated LEDs 32 are staggered about a line, with the staggering comprising offsetting the LEDs from the line by a predetermined distance in alternating directions perpendicular to the line. As will be detailed further below, in some embodiments of the present invention LED 32 (or a plurality of LEDs) are positioned at a focal distance of reflecting surface 24.

Figure 5:
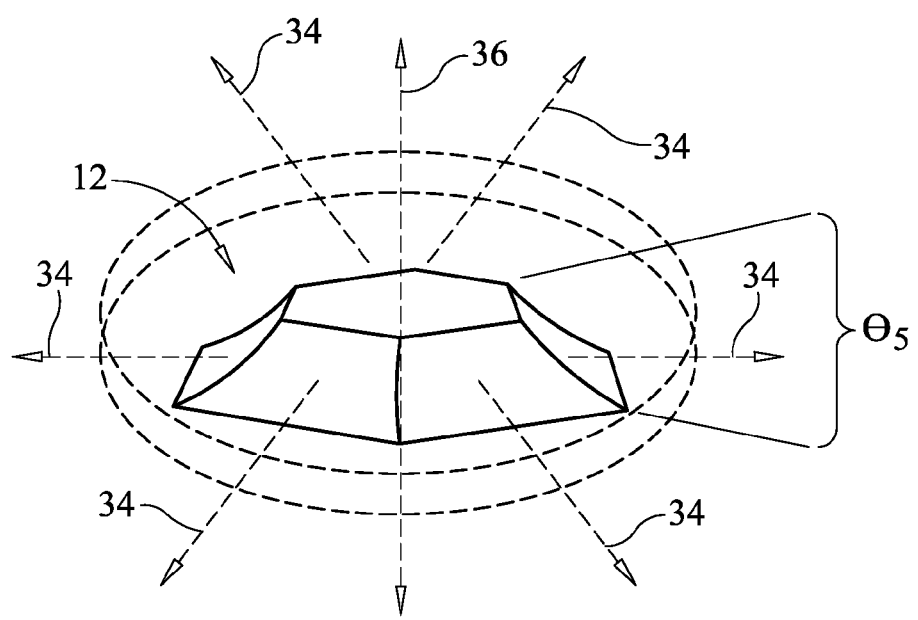
FIG. 5 describes optical characteristics of the optic of FIG. 2.

FIG. 5 depicts a partial perspective view of an embodiment of lighting system 10 in which the lighting system emits light outward over a 360° angular distribution about a central axis 36 of the reflector 22 of optic 12. Such a 360° angular distribution of reflected light may be a requirement for lighting system 10 to provide obstruction warning in all directions. The light emitted from the beacon light 20 has a predetermined beam spread $\theta_5$. The beam spread $\theta_5$ is the angle, vertically perpendicular to the optical axes 34 of the reflecting surfaces 24, over which the intensity of the emitted light is greater than 50% of the peak intensity of the emitted light. In a preferred embodiment, lighting system 10 has a beam spread $\theta_5$ of less than 3°. In another embodiment, lighting system 10 has a beam spread $\theta_5$ of less than 10°.

Figure 6:
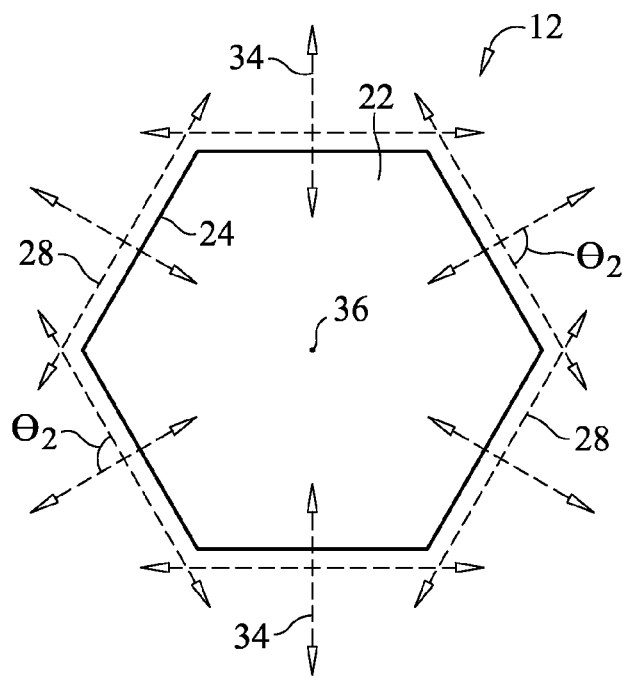
FIG. 6 is a sectional top view of a reflector of the optic of FIG. 2.

Referring again to FIGS. 2 and 3, the plurality of reflecting surfaces 24 of reflector 22 are arranged such that each of the associated linear axes 28 is angled relative to the linear axis of another reflecting surface. In one embodiment, the plurality of linear axes 28 occupy a single plane and intersect each other to outline a polygon. In other words, a top-view cross-section of reflector 22 may have a perimeter which is polygonal in shape. FIG. 6 depicts a sectional top view of an embodiment of reflector 22, showing the plurality of associated linear axes 28 intersecting each other to form a hexagon. This embodiment of reflector 22 achieves the aforementioned 360° angular distribution, relative to the central axis 36 of reflector 22, of light emitted from optic 12. Each reflecting surface 24 preferably reflects light in the direction of the optical axis 34 associated with that reflecting surface, and through an angular distribution horizontally symmetric to and centered to the optical axis.

Although FIG. 6 depicts a polygon embodiment of reflector 22 having six reflecting surfaces 24 it will be understood that the reflector may have greater or fewer reflecting surfaces within the scope of the invention. In addition, the intersection of the plurality of linear axes 28 need not outline a polygon. Furthermore, light emitted from optic 12 need not have a 360° angular distribution relative to the central axis 36 of reflector 22. Such an embodiment may instead have, for example, a 180° angular distribution.

In some embodiments of the present invention the plurality of reflecting surfaces 24 of reflector 22 may be connected together. Accordingly, reflecting surfaces 24 may be made as separate pieces and joined together. Alternatively, reflecting surfaces 24 may be formed as a unitary piece.

Figure 7:
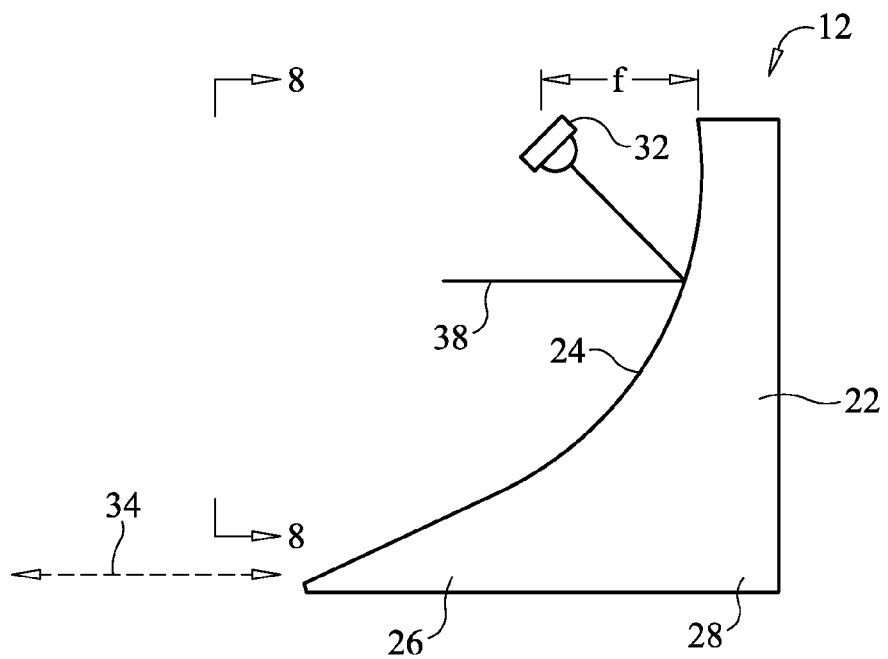
FIG. 7 is a partial side view of the optic of FIG. 2, showing simulated light ray traces.

FIG. 7 shows a partial side view of an embodiment of optic 12. LED 32 is located at a focal distance "f" of reflecting surface 24. FIG. 7 also shows simulated ray traces 38 showing the path of light traveling from LED 32 to reflecting surface 24 and outward from reflector 22. As can be seen, ray traces 38 are generally parallel to optical axis 34 of optic 12.

Figure 8:
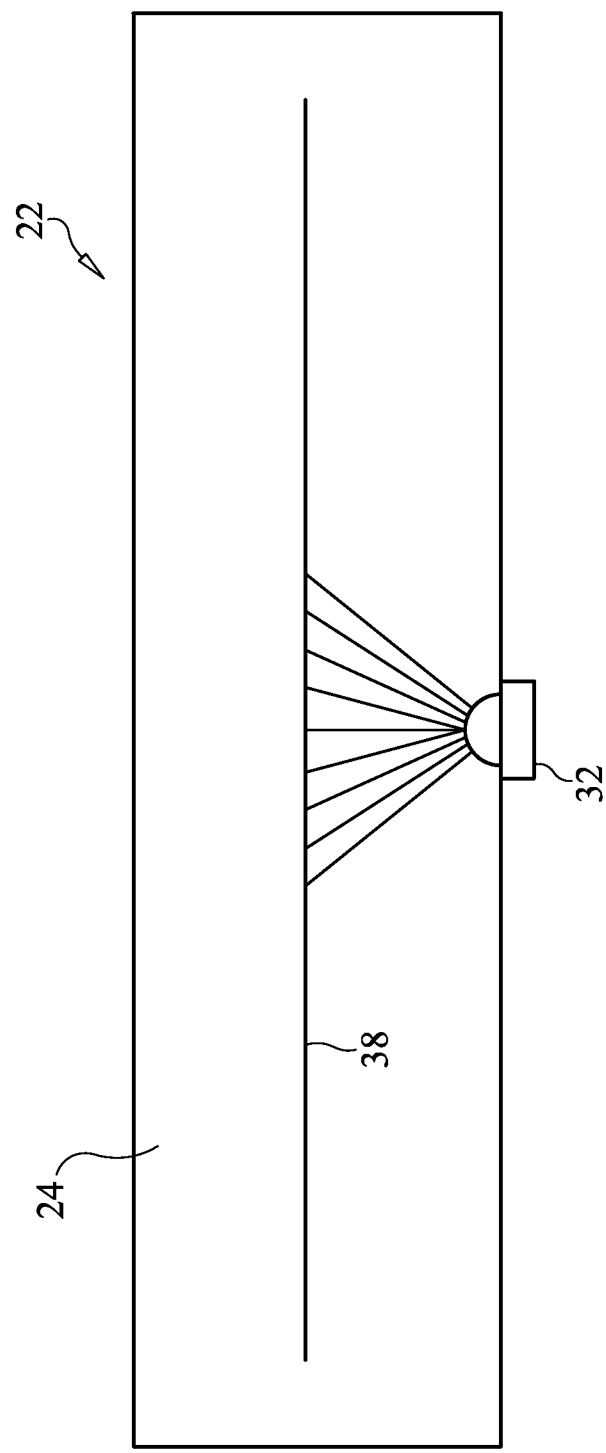
FIG. 8 is a partial front view of the optic of FIG. 7, showing the same light ray traces from another view.

FIG. 8 shows a partial frontal view of the optic 12 of FIG. 7, showing the same simulated ray traces 38 as FIG. 7. Because reflecting surface 24 of FIGS. 7 and 8 is a projection of the cross-section 26 along the linear axis 28, light traveling from LED 32 to the reflecting surface results in collimated light that is reflected generally parallel to the optical axis 34 of reflecting surface 24.

Figure 9:
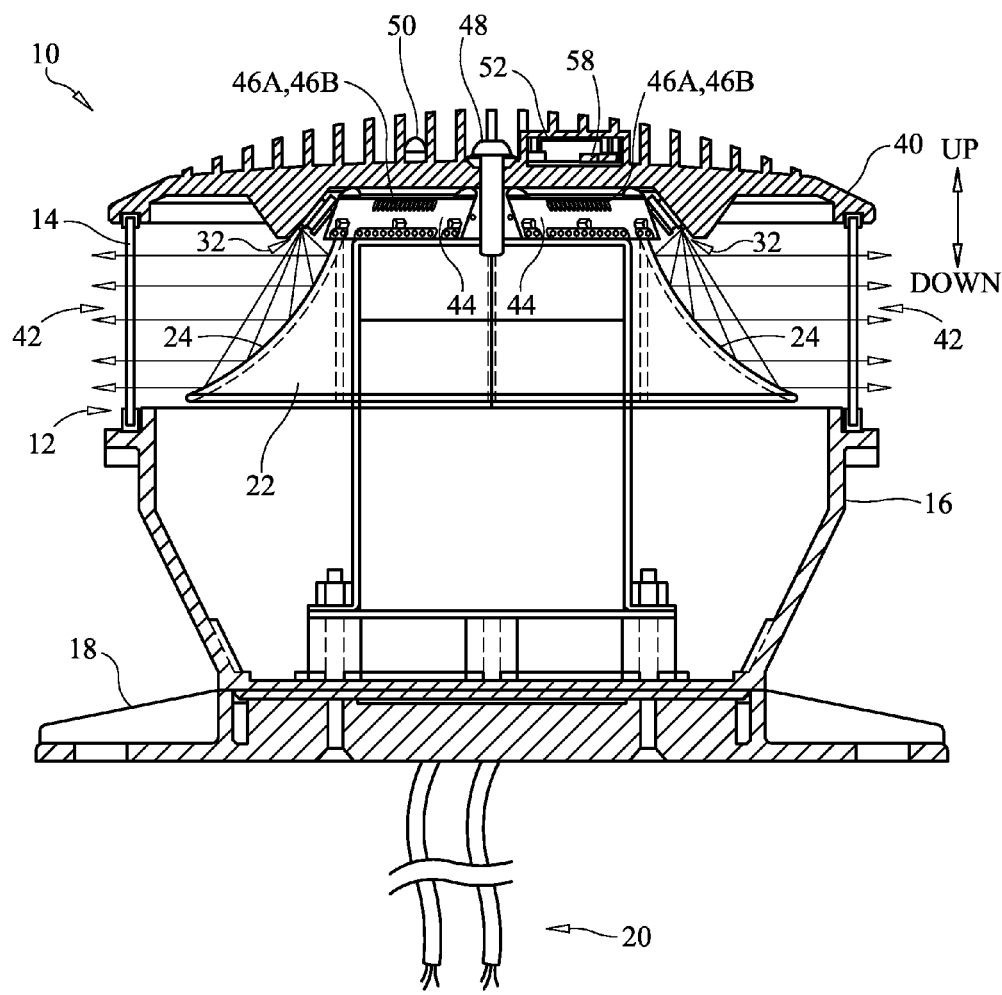
FIG. 9 is a view in section of the obstruction light of FIG. 1.

A view in section of lighting system 10 is shown in FIG. 9 according to an example embodiment of the present invention. Reflector 22 is oriented such that a base portion or "side" 37 (FIG. 2) of the reflector is directed downwardly and generally toward housing 16, while an opposing, spaced-apart, smaller top portion or "side" 39 is directed upwardly and generally away from the housing. Reflecting surfaces 24 extend between the base side 37 and the top side 39 of reflector 22. A plurality of LEDs 32 are oriented downwardly and generally toward housing 16 at an inward angle, and are further aimed toward complementary reflecting surfaces 24 of reflector 22. A heat sink 40 atop lens 14 provides both a mounting point and a cooling means for LEDs 32 and, optionally, any associated control or driver electronics (not shown). Lens 14 provides protection for LEDs 32 and reflector 22, shielding them from exposure to the elements. Mounting base 18 facilitates installation of lighting system 10 at a desired site.

LEDs 32 may be any type of light emitting diode suitable for use with lighting system 10. As a non-limiting example, LEDs 32 may be arranged in a linear or non-linear array (FIG. 2), and may be packed in groups or sub-groups having a predetermined number of LED elements. In one embodiment of the present invention LEDs 32 are oriented to extend downwardly from heat sink 40 and are aimed inwardly (i.e., generally toward central axis 36) at an angle of about 45 degrees as discussed above, though greater and lesser angles are anticipated within the scope of the invention.

By positioning LEDs 32 in the manner shown in FIG. 9 a beam of light 42 emitted by the LEDs is directed toward a focusing area of reflector 22, so the beam is relatively tightly focused. In addition, heat sink 40 substantially blocks undesired light emissions from LEDs 32 in an upwardly direction from lighting system 10, thereby limiting light pollution generated by the lighting system in the upward direction from the lighting system. Similarly, directly-emitted light from LEDs 32 is limited by reflector 22 and housing 16 to block light emitted by LEDs 32 from traveling in a downwardly direction from lighting system 10.

In some embodiments of the present invention LEDs 32 are mounted on detachable, insulated metal substrates 44 to form light source assemblies that easily plug into mating connectors situated in lighting system 10. Such non-leaded assemblies reduce the labor associated with replacing the LEDs and eliminate service problems associated with wire-lead breakage.

For example, substrates 44 may include a connector portion 46A that is configured to electrically and mechanically couple to a mating connector 46B mounted to heat sink 40. Connectors 46A, 46B are preferably selectably detachable. Thus, in the event that one or more substrates 44 are replaced, heat sink 40 may be detached from lighting system 10 by removing a fastener 48 from a threaded receptacle in housing 16 to expose substrates 44. The select substrates 44 are detached from their respective mating connectors 46B and replaced. Once the select substrate(s) 44 are replaced, heat sink 40 is placed onto lighting system 10 and fastener 48 is re-installed, securing the heat sink to the lighting system.

In some embodiments of the present invention lighting system 10 includes at least one auxiliary lighting assembly having one or more auxiliary LEDs 50, preferably configured to emit light upwardly from lighting system 10. In some embodiments auxiliary LED 50 may differ from LEDs 32. For example, auxiliary LED 50 may be configured to emit infrared light to alert flight crews operating with night vision imaging systems (NVIS).

Figure 10:
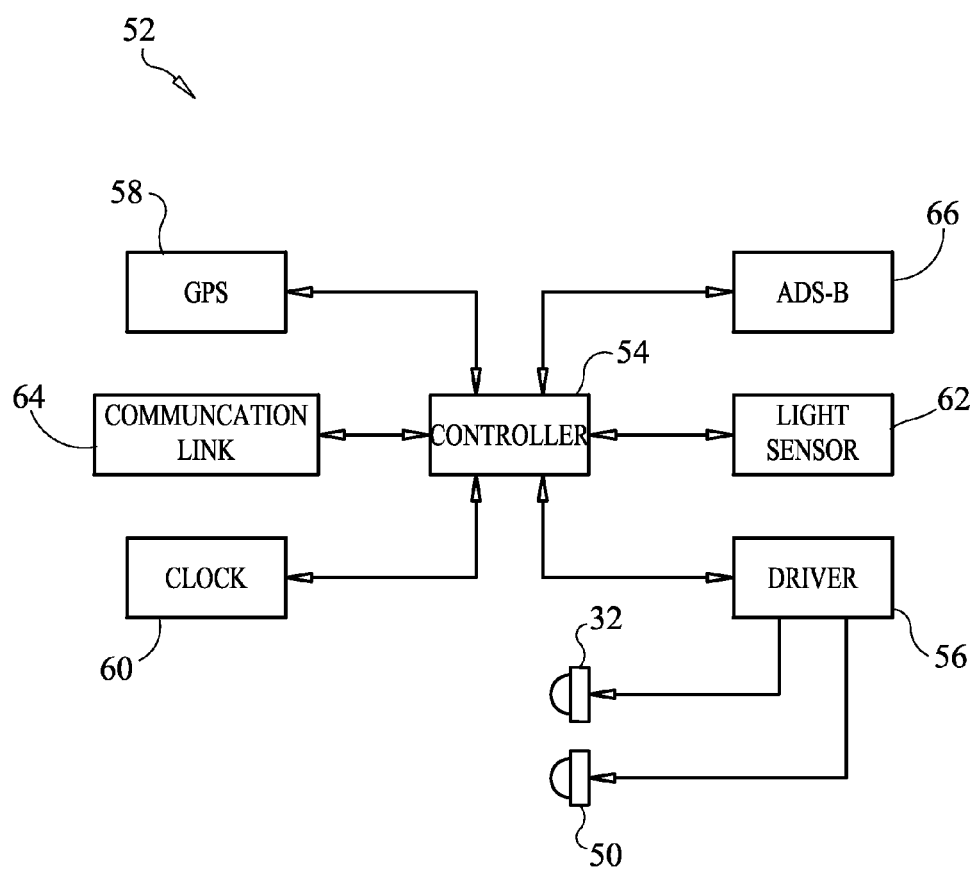
FIG. 10 is a schematic block diagram showing the general arrangement of a control system for an obstruction light according to an embodiment of the present invention.

With reference to FIG. 10, lighting system 10 may include a control system 52 that may be configured (or reconfigured) as desired to suit a particular installation. In some embodiments control system 52 includes a controller 54. Controller 54 may be a digital microprocessor-based control unit configured to receive input signals and process same according to control logic to control the operation of lighting system 10. Alternatively, controller 54 may comprise other digital architectures utilizing, for example, a computer, microcontroller, programmable logic device and the like. The control logic of controller 54 may be defined by a set of predetermined instructions, such as a computer program or "fuzzy logic." In other embodiments of the present invention portions of controller 54 may be analog, such as an analog open- or closed-loop control system. Controller 54 may be a separate, standalone component or made integral with (or distributed about) lighting system 10, such as housing 16 and heat sink 40.

A driver 56 of control system 52 controls the operation of LEDs 32, 50, controlling the voltage and/or current supplied to the LEDs, and detecting and compensating for faults within the LEDs. Driver 56 may also control the flash rate of LEDs 32, 50 in accordance with control signals provided by controller 54. Furthermore, when LEDs 32, 50 are to be turned off driver 56 may remove power supplied to the LED in accordance with control signals provided by controller 54.

Control system 52 may utilize a local or remote global positioning satellite (GPS) receiver 58, a clock 60, and so on to determine sundown and sunup to automatically turn lighting system 10 on and off accordingly and/or control the brightness of the output light via driver 56. In one embodiment of the present invention an ambient light sensor 62 may be utilized for this purpose, providing to controller 54 an electrical signal corresponding to the level of ambient light proximate lighting system 10. Ambient light sensor 62 may likewise be used as a control signal for control system 52 to dim the light output from LEDs 32 during periods of low-light, such as during inclement or overcast weather.

Control system 52 may also include a one-way or two-way communication link 64 to facilitate remote control and monitoring of the status and operation of lighting system 10. Communication link 64 may include one or more of a radio frequency or light-based communication link.

In some embodiments of the present invention lighting system 10 may include an Automatic Dependent Surveillance-Broadcast (ADS-B) surveillance system 66 to detect aircraft equipped with ADS-B capability. ADS-B is an anti-collision technology being adopted by aircraft operators to provide airborne collision avoidance capability. ADS-B is the linchpin technology of the Federal Aviation Administration's (FAA's) current "NextGen air traffic management system." ADS-B is intended to enable the FAA to safely increase the density of air traffic while simultaneously reducing aircraft fuel consumption, allowing more dynamic and direct routing, improving anti-collision capability in aircraft, and enabling information exchange with airborne aircraft. At the core of the ADS-B system is a "heartbeat" that is transmitted by outfitted aircraft providing the aircraft's identification, location, velocity, and other relevant state data. Ground-based and airborne ADS-B transceivers can receive this heartbeat and accurately determine an aircraft's position, direction, and velocity in a timely manner.

ADS-B system 66 may include sensing apparatus within or proximate to lighting system 10 to detect "targets," i.e., vehicles in the vicinity of a predetermined area, or an object or structure and then generate data relating to the targets. Alternatively, ADS-B system 66 may receive target data from sources remote from lighting system 10, either directly or via communication link 64. In various embodiments of the present invention ADS-B system 66 may utilize, without limitation, radar, sonar and proximity sensors to generate target data. ADS-B system 66 may also utilize information obtained on the Internet to generate target data. In fact, ADS-B system 66 may include or utilize any type of system, device or apparatus now known or later invented having a target detection capability. It is intended that ADS-B system 66 be configured with the ability to detect a target vehicle.

With reference to FIGS. 9 and 10 together, in some embodiments of the present invention the illumination characteristics of lighting system 10 may be adjusted by control system 52 to correspond to the level of the threat of a collision. For example, lighting system 10 may be regularly increased in brightness and/or flash rate as a target approaches an associated predetermined obstruction, then decrease as the target moves away. Similarly, an aural signal may increase in frequency as a target approaches a predetermined obstruction, then decrease as the target moves away. Finally, if the control system 52 detects a target within a predefined envelope which could be a hazard, the control system may broadcast (using, for example, communication link 64) over radio frequency, Internet, or other media an ADS-B compliant warning to alert the aircraft to a potential hazard.

A method of using optic 12 or lighting system 10 includes arranging a plurality of reflecting surfaces 24 relative to each other, the reflecting surfaces having a linearly-projected cross-section 28. The method also includes the step of positioning at least one LED 32 relative to at least one of the reflecting surfaces 24, the positioning step angling the central light-emitting axis 30 of the LED relative to the optical axis 34 associated with the reflecting surface 24 at about 45°. The method also comprises transmitting light from LED 32 to the reflecting surface 24. In one embodiment of the method, the about 45° has a tolerance of ±15°.

In one embodiment of the method, the at least one LED 32 comprises a plurality of LEDs, the at least one optical axis 34 comprises a plurality of optical axes, and the positioning step comprises positioning each of the plurality of LEDs relative to a respective one of the plurality of optical axes 34 at about 45°. In one embodiment of the method, each reflecting surface 24 comprises a cross-section projected along a linear axis 28, and the arranging step comprises arranging the plurality of reflecting surfaces 24 relative to each other so that a plurality of the linear axes are angled relative to each other.

While this invention has been shown and described with respect to a detailed embodiment thereof, it will be understood by those skilled in the art that changes in form and detail thereof may be made without departing from the scope of the claims of the invention. For example, although the disclosed invention is described in terms of use as an obstruction light for the purpose of illustration, one skilled in the art will appreciate that the disclosed invention may be utilized to advantage in any suitable type of lighting.

What is claimed is:

1. A lighting system, comprising:
a housing;
a reflector arranged atop the housing, the reflector having:
   a central axis;
   a plurality of reflecting surfaces, the plurality of reflecting surfaces having at least one optical axis, each of the reflecting surfaces further including a linearly projected cross-section along a respective linear axis oriented generally orthogonally with respect to the central axis, and
   a base side and an opposing, spaced-apart top side, the top side of the reflector being smaller in size than the base side, the base side of the reflector being oriented toward the housing and the top side being oriented away from the housing; and
a plurality of light emitting diodes (LEDs) positioned in a line generally parallel to the linearly projected cross-section of the plurality of reflecting surfaces, the LEDs being further positioned proximate the top side of the reflector and angled toward the housing, the LEDs being oriented relative to an associated reflecting surface such that a central light-emitting axis of the plurality of LEDs is angled relative to the at least one optical axis of the associated reflecting surface at about 45°.

2. The lighting system of claim 1 wherein the about 45° has a tolerance of ±15°.

3. The lighting system of claim 1 wherein the reflecting surfaces redirect and collimate a light output of the plurality of LEDs at an angle of about 45° with respect to the central light emitting axis of the plurality of LEDs.

4. The lighting system of claim 3 wherein the about 45° has a tolerance of ±15°.

5. The lighting system of claim 1 wherein the linearly projected cross-section of the reflecting surfaces comprises a substantially conic shape.

6. The lighting system of claim 1 wherein the reflector is a segmented reflector.

7. The lighting system of claim 1 wherein the linear axes of the reflecting surfaces are angled relative to each other.

8. The lighting system of claim 1 wherein at least one of the plurality of reflecting surfaces comprises at least one of highly-polished metal, a coated metal substrate, a coated nonmetal substrate, a reflective film applied to a metal substrate, or a reflective film applied to a nonmetal substrate.

9. The lighting system of claim 1, further including an auxiliary lighting assembly having at least one auxiliary light emitting diode, a central light emitting axis of the auxiliary light emitting diode being oriented away from the reflector.

10. The lighting system of claim 5 wherein the auxiliary light emitting diode emits infrared light.

11. The lighting system of claim 1, further including a lens, the lens surrounding the reflector and the LEDs.

12. The lighting system of claim 11, further including a heat sink atop the lens,
   the heat sink being coupled to the housing, and
   the LEDs being coupled to the heat sink.

13. The lighting system of claim 12 wherein the LEDs are mounted to at least one substrate, the at least one substrate being coupled to the heat sink.

14. The lighting system of claim 1, further including a control system, the control system having a driver coupled to the LEDs.

15. The lighting system of claim 14 wherein the control system further includes at least one of a GPS receiver, a clock, or a light sensor.

16. The lighting system of claim 14 wherein the control system further includes a communication link.

* * * * *